(12) United States Patent
Saika

(10) Patent No.: US 7,979,465 B2
(45) Date of Patent: Jul. 12, 2011

(54) DATA PROTECTION METHOD, AUTHENTICATION METHOD, AND PROGRAM THEREFOR

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 425 days.

(21) Appl. No.: 11/927,966

(22) Filed: Oct. 30, 2007

(65) Prior Publication Data
US 2008/0072319 A1    Mar. 20, 2008

Related U.S. Application Data

(62) Division of application No. 10/899,085, filed on Jul. 27, 2004, now Pat. No. 7,308,450.

(30) Foreign Application Priority Data

Mar. 24, 2004    (JP) .................................. 2004-087705

(51) Int. Cl.
*G06F 7/001* (2006.01)
(52) U.S. Cl. ........................................ 707/781; 707/786
(58) Field of Classification Search ...... 714/6; 707/781, 707/786
See application file for complete search history.

(56) References Cited

U.S. PATENT DOCUMENTS

| | | | |
|---|---|---|---|
| 5,450,593 | A | 9/1995 | Howell et al. |
| 5,564,016 | A | 10/1996 | Korenshtein |
| 5,774,650 | A | 6/1998 | Chapman et al. |
| 6,009,427 | A | 12/1999 | Wolff |
| 6,070,243 | A | 5/2000 | See et al. |
| 6,073,105 | A | 6/2000 | Sutcliffe et al. |
| 6,076,105 | A | 6/2000 | Wolff et al. |
| 6,766,397 | B2 | 7/2004 | O'Hare et al. |
| 2002/0166079 | A1* | 11/2002 | Ulrich et al. ...................... 714/6 |
| 2004/0049675 | A1* | 3/2004 | Micali et al. .................. 713/158 |
| 2005/0060580 | A1 | 3/2005 | Chebolu et al. |
| 2005/0149763 | A1 | 7/2005 | Nakao |

FOREIGN PATENT DOCUMENTS

| | | |
|---|---|---|
| JP | 2001-195255 | 7/2001 |
| JP | 2003-330802 | 11/2003 |

* cited by examiner

*Primary Examiner* — Shahid A Alam
*Assistant Examiner* — Donald Lawson
(74) *Attorney, Agent, or Firm* — Hitachi America, Ltd.

(57) ABSTRACT

A data protection method for accepting an access request for a file stored in a file system of a storage device and referring or updating to the file based on the access request, including the steps of: determining whether a current time is within a preset monitoring period; obtaining a snapshot of the file system when the time reaches the monitoring period; and updating the file system with the snapshot when the time reaches end of the monitoring period.

4 Claims, 11 Drawing Sheets

| ACCOUNT ID | PASSWORD | ACCOUNT REGISTRATION DATE | NUMBER OF PASSWORD CHANGES | CHANGE FREQUENCY (TIMES/ MONTH) | AUTHENTICATION METHOD | LAST AUTHENTICATION DATE/TIME | NUMBER OF WARNINGS |
|---|---|---|---|---|---|---|---|
| user001 | ************ | 2003/11/1 | 10 | 2.5 | PASS | 2004/3/3 9:03 | |
| user002 | %%%%%%%%%% | 2003/10/2 | 5 | 1.25 | IC | 2004/3/3 12:13 | |
| user003 | &&&& | 2003/9/3 | 1 | 0.25 | PASS | 2007/2/311:15 | |
| --- | --- | --- | --- | --- | --- | --- | --- |

FIG. 3

| RATING | AUTHENTICATION METHOD | PASSWORD LENGTH | CHANGE FREQUENCY | NUMBER OF WARNINGS | UNUSED DURATION |
|---|---|---|---|---|---|
| LV1 | PASS | < 10 | BELOW ONCE/ MONTH | > 5 TIMES | > 30 DAYS |
| LV2 | PASS | ≧ 10 | ABOVE TWICE/ MONTH | ≦ 5 TIMES | ≦ 30 DAYS |
| LV3 | IC | — | — | — | — |

FIG. 5

| ACCOUNT ID | RATING | PERMITTED ACCESS CLASS |
|---|---|---|
| user001 | LV1 | FORBIDDEN |
| user002 | LV2 | RESTRICTED ACCESS |
| user003 | LV3 | UNRESTRICTED |
| ⋮ | ⋮ | |
| ⋮ | ⋮ | |

FIG. 6

DATA PROTECTION METHOD, AUTHENTICATION METHOD, AND PROGRAM THEREFOR

CROSS REFERENCE TO RELATED APPLICATION

This is a divisional of U.S. application Ser. No. 10/899,085, filed Jul. 27, 2004 now U.S. Pat. No. 7,308,450. This application relates to and claims priority from Japanese Patent Application No. 2004-087705, filed on Mar. 24, 2004 now JP. Pat. No. 4585213. The entirety of the contents and subject matter of all of the above is incorporated herein by reference.

BACKGROUND

The present invention relates to data protection for a computer that allows access to a file system based on user authentication.

In a method of protecting data stored in a storage device of a computer, an administrator sets access rights for users who may access the data to reject access from users without access right, thus protecting the data.

Conventionally, when a user without access right (operator, etc.) needs to access data under access restriction for maintenance and other purposes, the operator is granted access on a case-by-case basis by modifying the access rights on the operator's computer side, as disclosed in, for example, JP 2003-330802 A.

SUMMARY

However, in the conventional art described above, when the administrator is absent, the access right for data cannot be granted, thus obstructing maintenance and other operations. In addition, it is necessary to install a monitoring program on each computer that may access the data. When the number of computers that may access the data increases, a greater deal of effort is also necessary for installation as well as for configuration of access rights, so that it is difficult for the administrator to address the situation in a flexible manner.

Furthermore, once access right is granted, there is a possibility that files beyond the administrator's intention may be accessed, and files that are not necessary for maintenance may be tampered.

In light of the above problems, it is an object of the present invention to allow for assigning access right to data irrespective of administrator's presence, and to protect the data even when there is any access beyond administrator's intention.

The present invention provides an authentication method for assigning a preset identifier to each user and assigning an access right for a file stored in a computer or the computer (or a network) based on authentication information corresponding to the identifier, comprising the steps of: verifying validity of the user by the identifier and the authentication information; assigning a preset first access right when the validity of the user is verified; determining whether a current time is within a preset monitoring period; setting a second access right to the identifier; modifying the access right to the second access right when the time is within the monitoring period; and restoring the access right to the first access right when the time is over the monitoring period to dynamically modify the access right within the monitoring period.

Also, the present invention provides a data protection method for accepting an access request for a file stored in a file system of a storage device and referring or updating to the file based on the access request, comprising the steps of: determining whether a current time is within a preset monitoring period; obtaining a snapshot of the file system when the time reaches the monitoring period; and updating the file system with the snapshot when the time reaches end of the monitoring period to restore the file system.

According to the present invention, the administrator previously assigns identifiers and authentication information to outsiders working for maintenance or other operations and needs only to set the monitoring period. This eliminates the need for lending identifiers (account IDs) to give permissions to make access to files at the start of maintenance operations by outsiders or for modifying the access right configuration of the file system. It is thus possible to ensure data security by automatically modifying access rights even in the administrator's absence. This makes it possible to ensure a very high level of security while requiring still less effort for administration.

In addition, any file updates that have occurred during a predetermined monitoring period are automatically restored to the start of the monitoring period. Even when any access beyond the administrator's intention including file tampering may occur in the administrator's absence such as at night or on holidays, such an unintentional access has no influence, thus allowing reliable protection of data.

BRIEF DESCRIPTION OF THE DRAWINGS

FIG. 3 is an explanatory diagram showing an example of the content of user information.

FIG. 5 is an explanatory diagram showing an example of policy information.

FIG. 6 is an explanatory diagram showing an example of the output of rating information.

DETAILED DESCRIPTION OF THE PREFERRED EMBODIMENTS

An embodiment of the present invention will now be described with reference to the accompanying drawings.

Figure 1:
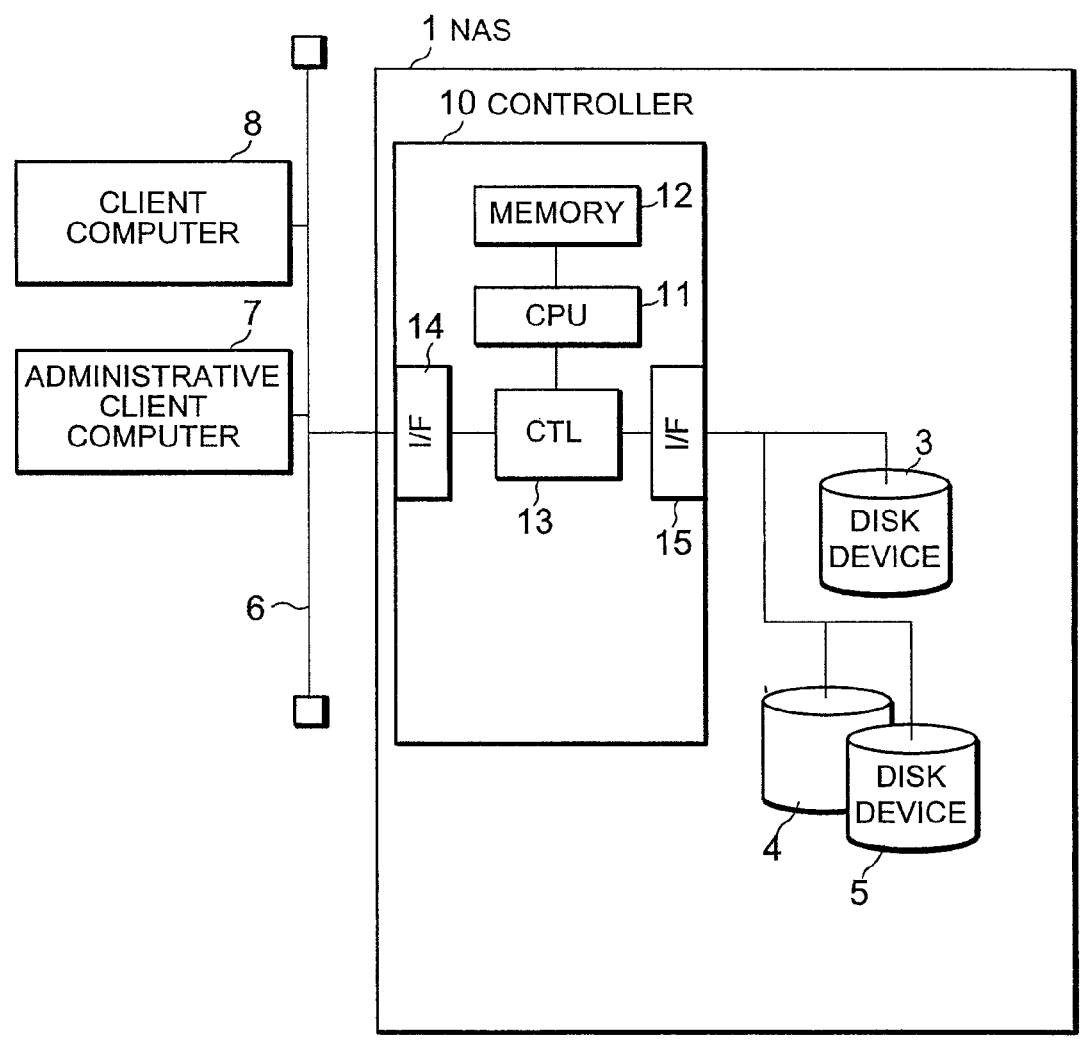
FIG. 1 is a block diagram showing an overall configuration of a system.
Figure 2:
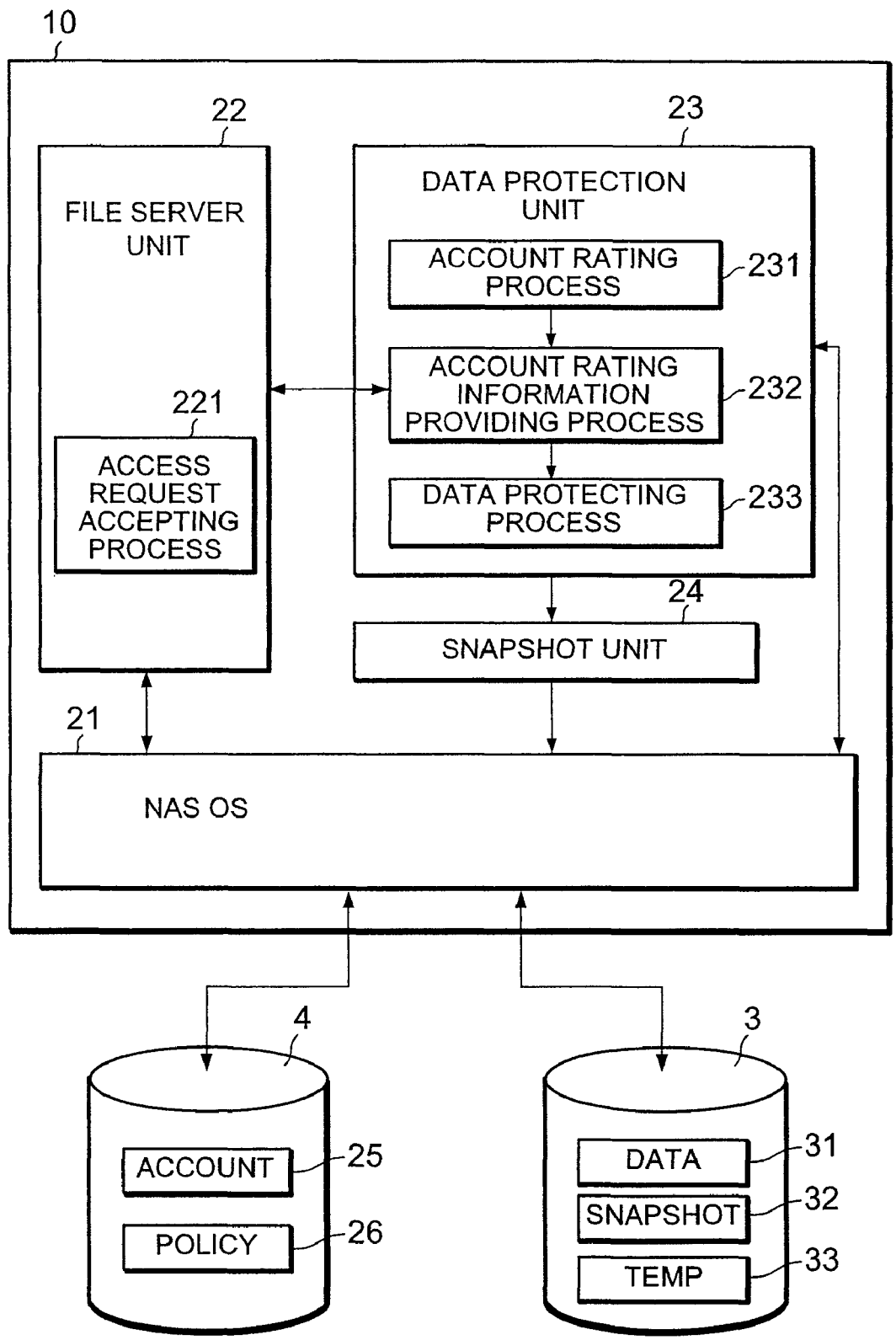
FIG. 2 is a block diagram showing a configuration of software executed by a controller of NAS.

FIG. 1 is a block diagram showing an overall configuration of a system in which the present invention is applied to a Network Attached Storage (NAS) 1. FIG. 2 is a block diagram showing a software configuration of the NAS 1.

The NAS 1 includes disk devices 3, 4 and 5, and a controller 10 that controls the disk devices 3 to 5. In addition, the NAS 1 is connected via a network 6 to an administrative client computer 7 that manages the NAS 1 and to a client computer 8 that requests data write (update) to and read (reference) from the NAS 1.

The administrative client computer 7 performs setting access rights for users who may make access (update or reference) to data (files) stored in the NAS 1, and setting access right for each file or directory in the NAS 1, as well as setting configuration of data protection described below. It should be noted that a previously configured file system is constructed in the disk devices 3 to 5.

The administrative client computer 7 and the client computer 8 include, although not shown, a CPU, a memory, an interface connected to the network 6, a display device, and an input device.

Under the operation of control programs described below, the controller 10 of the NAS 1 performs user authentication from the client computer 8, and then controls input/output of data for the disk device 3 in response to a file reference or update request, while performing a data protecting process described below.

In FIG. 1, the controller 10 of the NAS 1 includes a CPU 11, a memory 12, a data transfer controller 13, a network interface 14, and a storage interface 15. The memory 12 may include a data cache (not shown), or the data cache may reside on the side of data transfer controller 13.

The memory 12 is loaded with control programs (see FIG. 2). The CPU 11 calls and executes the control programs to perform various processes described below.

The data transfer controller 13 transfers data among the CPU 11, the network interface 14, the storage interface 15, and the memory 12.

FIG. 2 shows functional blocks of the control programs executed by the controller 10. A NAS_OS 21 performs execution administration for the control programs. Under the control of the NAS_OS 21, the control programs such as a file server unit 22, a data protection unit 23, and a snapshot unit 24 which are described below are used to perform user authentication in response to an authentication request from the client computer 8 and to perform a reference (read) or update (write) for files in the disk device 3 in response to a reference or update request from the authenticated user. In addition, during a data protection monitoring time that has been preset, the control programs are used to dynamically modify the access right of the account ID of the user to perform access restriction, thereby effecting data protection (prevention of file tampering).

In response to an authentication request from the client computer 8, the file server unit 22 performs authentication by checking the account ID of the requesting user against the preset user account ID based on his/her password. Subsequently, the file server unit 22 accepts a reference or update request from the authenticated user (account ID) and performs reference or update on the disk device 3 (file access accepting process). It should be noted that the user information 25 including the account IDs and passwords of users is stored in the disk device 4, and set from the administrative client computer 7 (or the client computer 8 having the administrator authorization).

First, the overall process will be described.

The file server unit 22 determines whether it is the data protection monitoring time (or data protection monitoring period) that has been set from the administrative client computer 7 or the like. When it is the data protection monitoring time (hereinafter referred to as monitoring time), the file server unit 22 requests the account rating information for the user account ID of the client computer 8 that has made an access request (authentication request, reference request, or update request) from the data protection unit 23. The data protection monitoring time is set as a time zone or period in which the administrator is absent such as, for example, at night or on holidays.

During the monitoring time, the file server unit 22 performs access restriction on the file reference or update request, as described below, based on the rating information for the account ID received from the data protection unit 23. This access restriction is canceled after the monitoring time expires, and the normal process is resumed.

The access restriction is summarized as follows. According to the rating based on the operating status of the account ID, the account rating during the monitoring time (access permission class) is roughly divided into three classes of forbidden access (hereinafter referred to as forbidden), restricted access (hereinafter referred to as restricted), and unrestricted access, based on the preset policy information 26.

During the monitoring time, access from account IDs having the "restricted" or "unrestricted" account rating is accepted. However, after the monitoring time, file updates made by restricted account IDs are revoked and the files are restored to the status at the start of the monitoring time. Only the file updates made by account IDs having the unrestricted account rating are reflected in the file system to finish the monitoring time. To this end, in the disk device 3, as shown in FIG. 2, a temporary storage area 33 for full access is reserved for storing files updated by users having the unrestricted account rating during the monitoring time.

When the monitoring time has started, the data protection unit 23 first acquires a preset snapshot of the file system (requesting acquisition of a snapshot from a snapshot unit 24), and stores it in a predetermined area (in this case, a snapshot memory area 32 of the disk device 3 in FIG. 2) as the data at the start of the monitoring time.

The data protection unit 23 then acquires snapshots at a predetermined time interval, and monitors the change of data during the monitoring time.

At the end of the monitoring time, the data protection unit 23 updates the file system with the snapshot at the start of the monitoring time, thereby restoring the status of the file system to the status at the start of the monitoring time. Subsequently, the data protection unit 23 updates the file system by writing thereon the files updated by unrestricted users, which have been stored in the temporary storage area 33 of the disk device 3 to finish the monitoring time.

In this way, any file updates made by users having the restricted account rating during the monitoring time are not reflected because the files are restored to the status at the start of the monitoring time. On the contrary, file updates made by users having the unrestricted account rating are written from the temporary storage area 33 after the snapshot at the status at the start of the monitoring time is restored, so that the file updates during the monitoring time can be correctly reflected.

Accordingly, account IDs having the restricted account rating may be lent to operators working for maintenance at night or on holidays, while account IDs having the unrestricted account rating may be assigned to in-house users working at night or on holidays. This enables outside operators to perform predetermined maintenance operations by accessing files during the maintenance operations irrespective of the administrator's presence. The in-house data can be reliably protected because any file updates made during this time are not reflected. On the other hand, employees working at night or on holidays can accomplish operations by using unrestricted account IDs so that their file updates, even during the maintenance operations by the operators, are certainly reflected in the file system at the end of the monitoring time.

Next, each control program executed by the controller 10 will be described below.

FIG. 3 is an explanatory diagram showing an example of the content of the user information 25 shown in FIG. 2.

The user authentication performed by the file server unit 22 and the account rating process performed by the data protection unit 23 are based on the user information 25. The user information 25 is set by the administrator from the administrative client computer 7 or the like. Users of the client computer 8 can also change passwords.

The user information 25 includes an account ID for each user set by the administrator and its associated password having any number of characters set by the administrator or the user which are combined in pairs. Passwords are encoded with a hash function or the like. The registration date of the account ID, the number of changes of the password, the authentication method, the last date and time of authentication, and the number of warnings at the time of setting the password are stored in association with these account ID and password.

One authentication method, denoted by PASS in the figure, uses character strings of an account ID and password entered via a keyboard or the like of the client computer 8. Another authentication method, denoted by IC in the figure, uses input from an IC card inserted into an IC card reader serving as an input device of the client computer 8.

The number of warnings indicates the number of warnings issued from the NAS 1 to the client computer 8 for reasons of mismatch of the password entered by the user or the like.

In addition, the change frequency of the password is determined as a mean value of the number of changes of the password per month from the registration date of the account ID to the current date.

On the basis of the user information associated with the account ID and the password as described above, the data protection unit 23 determines the reliability of the account ID, that is, the level of security for each user, and generates the rating information for the account as described below.

The data protection unit 23 reads a policy from the policy information 26 preset in the disk device 4. The policy provides a basis for generating the rating information for the account. The data protection unit 23 then performs rating for each account ID based on the user information 25 and the policy information 26.

Figure 4:
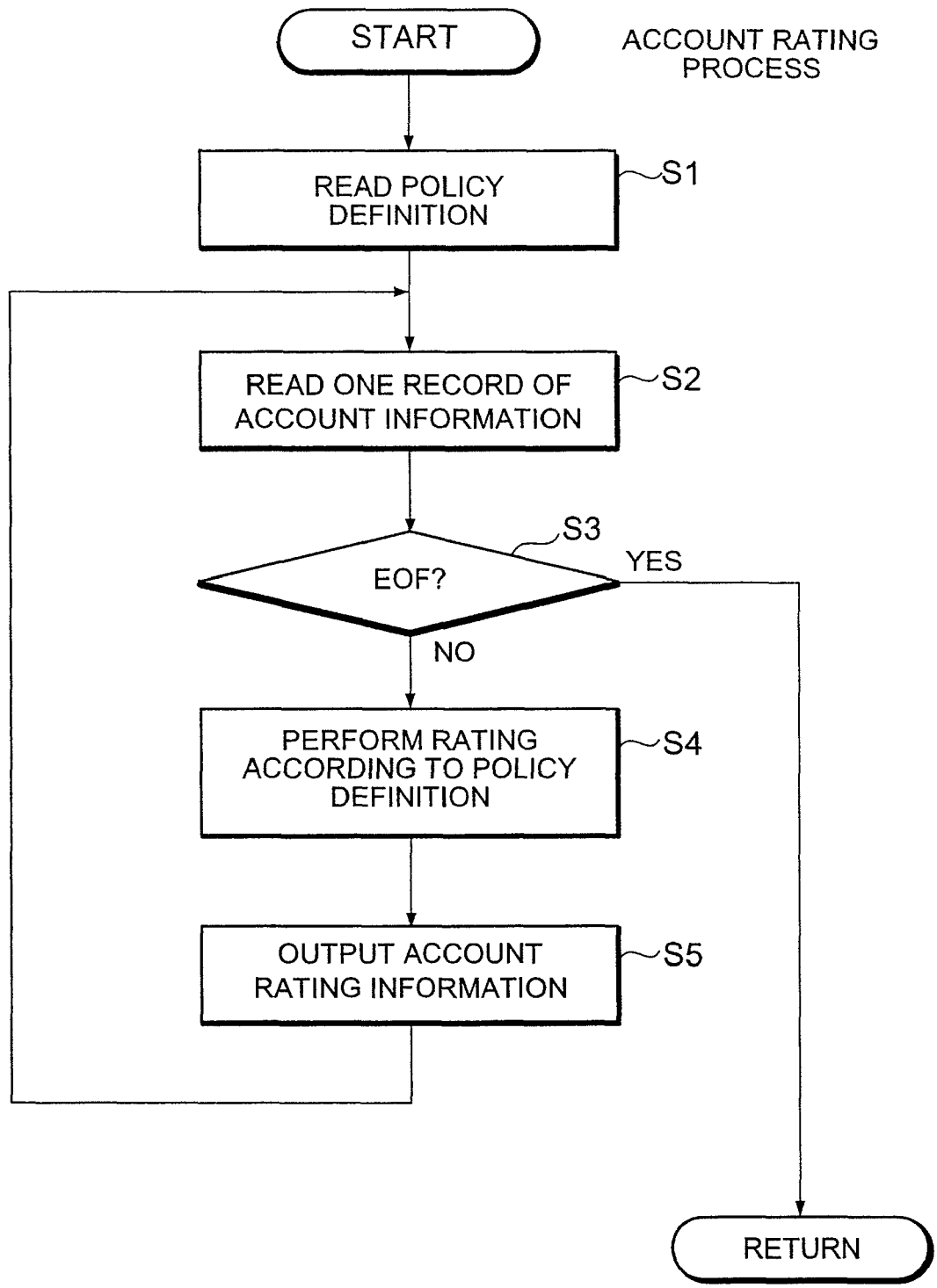
FIG. 4 is a flowchart showing an example of an account rating process performed by a data protection unit at the start of the monitoring time.

Referring to FIGS. 4 and 5, the policy information 26 will be described in a situation where the ratings for account IDs are divided into three types as described above, that is, a level LV1 for the lowest rating that forbids all accesses, a level LV2 for the "restricted" rating that permits access in part, and a level LV3 for the "unrestricted" rating that permits all accesses.

FIG. 4 is a flowchart showing an example of the account rating process performed by the data protection unit 23 at the start of the monitoring time. FIG. 5 is an explanatory diagram showing an example of the policy information 26.

First, in S1, a policy definition that defines account ratings preset in the policy information 26 is read. In S2, one record is read from the user information 25. In S3, it is determined whether it comes to an EOF (End Of File).

When it is not EOF, in S4, the rating is determined based on the read user information and the policy information.

The rating is determined based on the security of the authentication method, the management condition of the password, the access frequency, and the like, according to the level of reliability of the account. For example, as shown in FIG. 5, the policy information 26 that includes the definition of ratings is preset.

For example, for the rating level LV1, the reliability of the account ID is determined to be low when one of the following conditions is satisfied, that is, the authentication method is PASS, the password length is less than 10 characters, the change frequency of the password is equal to or less than once per month, the number of warnings exceeds five, and the unused duration exceeds 30 days. In this case, the lowest rating level LV1 is set and any access during the monitoring time will be rejected.

For the second rating level LV2, the reliability of the account ID is determined to be relatively high when all of the following conditions are satisfied, that is, the authentication method is PASS, the password length is equal to or more than 10 characters, the change frequency of the password is equal to or more than twice per month, the number of warnings is equal to or less than five, and the unused duration is equal to or less than 30 days. In this case, the rating level LV2 is set and access during the monitoring time is restrictively permitted. For the rating level LV2, although files on the file system can be updated, they are overwritten with the snapshot after the monitoring time expires so that the file updates are not reflected, because the rating is restricted as described above.

For the highest rating level LV3, when the authentication method is the IC card, the rating level LV3 is assigned and unrestricted access during the monitoring time is permitted so that the file updates will be reflected.

In S5, the rating information as determined above is outputted. The output of the account rating information is stored in a predetermined area on the memory 12 or the disk device 3 where the account ID is paired with the rating level and access permission.

The above process in S1 to S5 is repeated until the last record of the user information 25. FIG. 6 shows the output of the rating information, in which the rating level and the access permission (permitted access class) is generated in association with each account ID.

Figure 7:
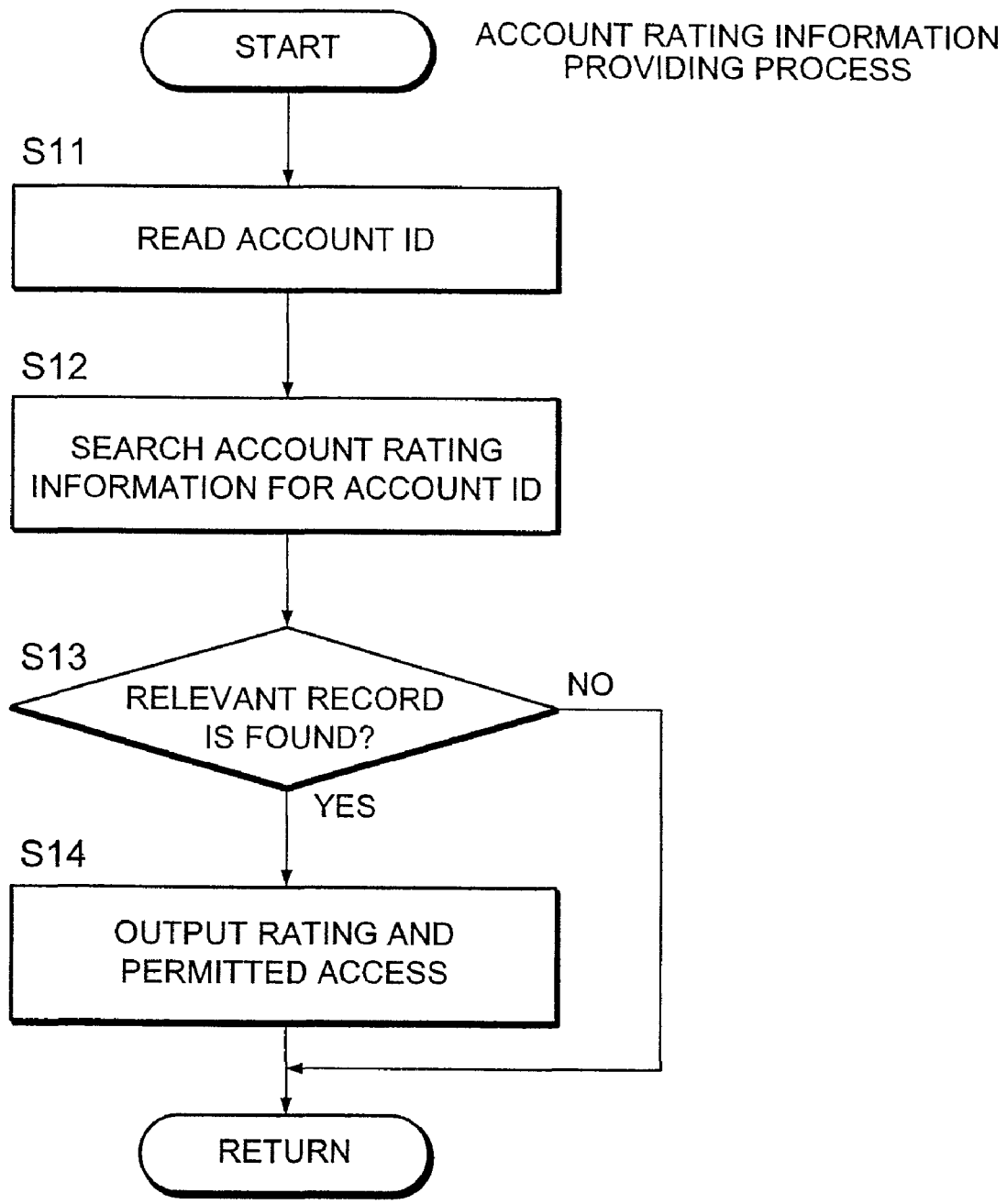
FIG. 7 is a flowchart showing an example of an account rating information providing process performed by a data protection unit during the monitoring time.

FIG. 7 is a flowchart showing an example of the account rating information providing process performed by the data protection unit 23 during the monitoring time. This flowchart is executed when the file server unit 22 receives an authentication request from the client computer 8 during the monitoring time and then queries the data protection unit 23 for the rating information of the account ID.

First, in S11, the account ID that the file server unit 22 has queried is read. In S12, the rating information is searched, which has been outputted in S5 as described above using the account ID as a key. In S13 and S14, when any relevant account ID is found, then the associated rating level LV and access permission are outputted to pass the rating information of the relevant account ID to the file server unit 22.

Figure 8:
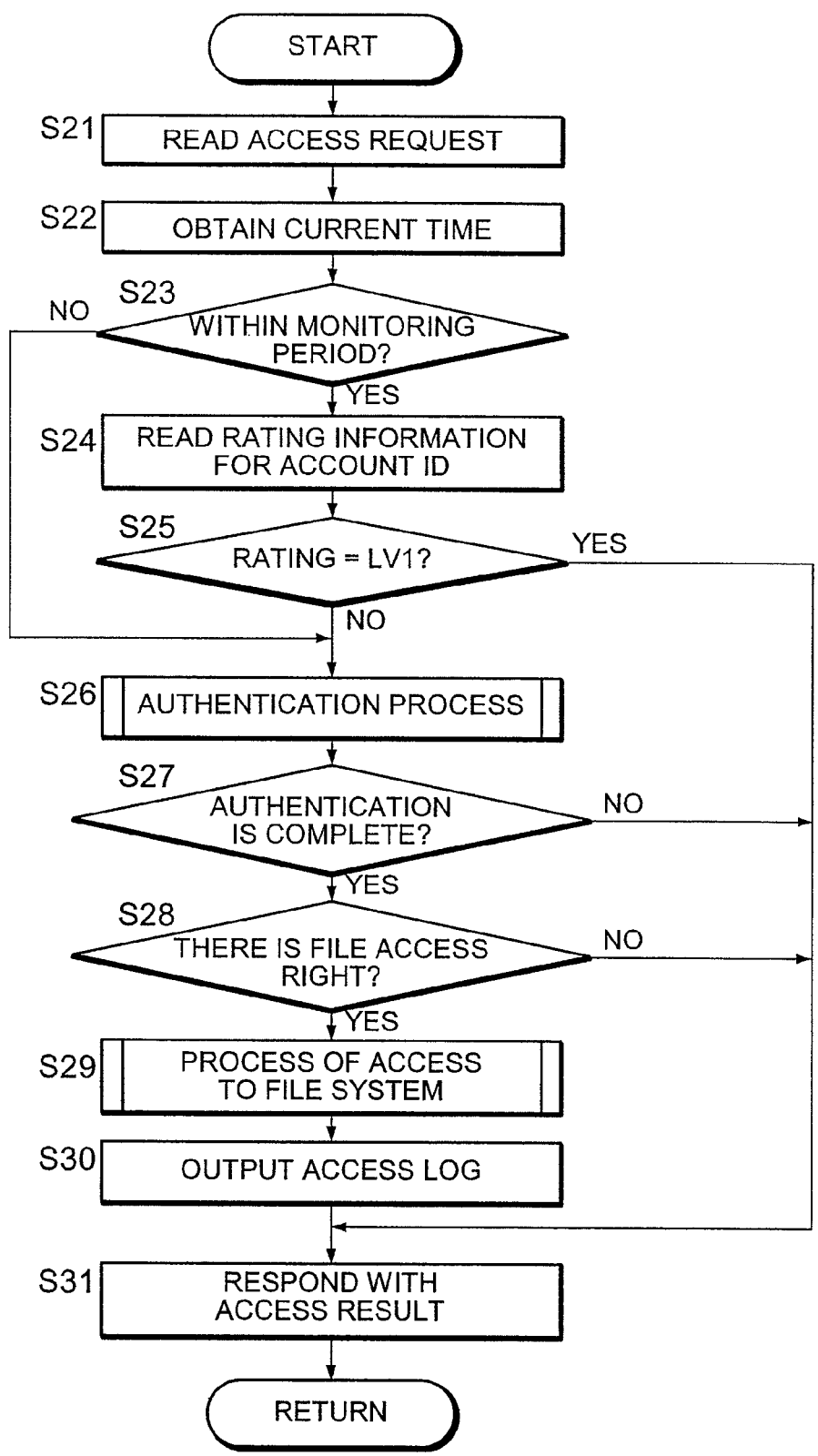
FIG. 8 is a flowchart showing an example of an access request accepting process performed by a file server unit.

Next, with reference to FIG. 8, an example of the access request accepting process performed by the file server unit 22 will be described. It should be noted that the flowchart of FIG. 8 is executed repeatedly at a predetermined cycle.

First, in S21, the process accepts an access request from the client computer 8. In S22, the current time is obtained. Then, in S23, it is determined whether the current time is within the predetermined monitoring time. When it is within the monitoring time, the process proceeds to S24. When it is outside the monitoring time, the process proceeds to S26. It should be noted that the access request includes an account ID, access type (reference or update), directory path and file name.

In S24, the account rating information providing process of FIG. 7 is required from the data protection unit 23 to obtain a rating level and access permission.

Next, in S25, it is determined whether the obtained rating level is the lowest rating level LV1. When it is the rating level LV1, the process proceeds to S31 to reject access because the access is forbidden during the monitoring time.

On the other hand, when the rating level is not the lowest, that is, when it is the rating level LV2 or LV3, the process proceeds to S26 to authenticate the account ID that has requested access. This authentication process is a normal authentication process. When the account ID and password stored in the user information 25 match the account ID and password entered from the client computer 8, the authentication is complete and the process proceeds from S27 to S28. If they do not match, the authentication fails and the process proceeds to S31.

In S28, it is determined whether the account ID that has requested access has access right for the file to which it has requested access. The access right set for each file on the file system side includes one of, for example, reference only, reference and update, and rejection, for each account ID (or user group (root, guest, etc.) associated with the account ID). It is determined whether the account ID satisfies the access right on the file system side. When the account ID has the access right, the process proceeds to S29 to perform the access process described below. On the other hand, when the account ID does not have the access right, the process proceeds to S31.

In S29, the access to the requested file is made in the file system. Then, in S30, the access log is outputted to a log file, and in S31, the access result is returned to the client computer 8.

The response in S31 is such that the file access result is returned when user authentication is complete and the user has access right, or notification of rejection is sent when the user authentication fails or the user does not have access right. During the monitoring time, for the rating level LV1, the user is notified that access is rejected because it is during the monitoring time.

Figure 9:
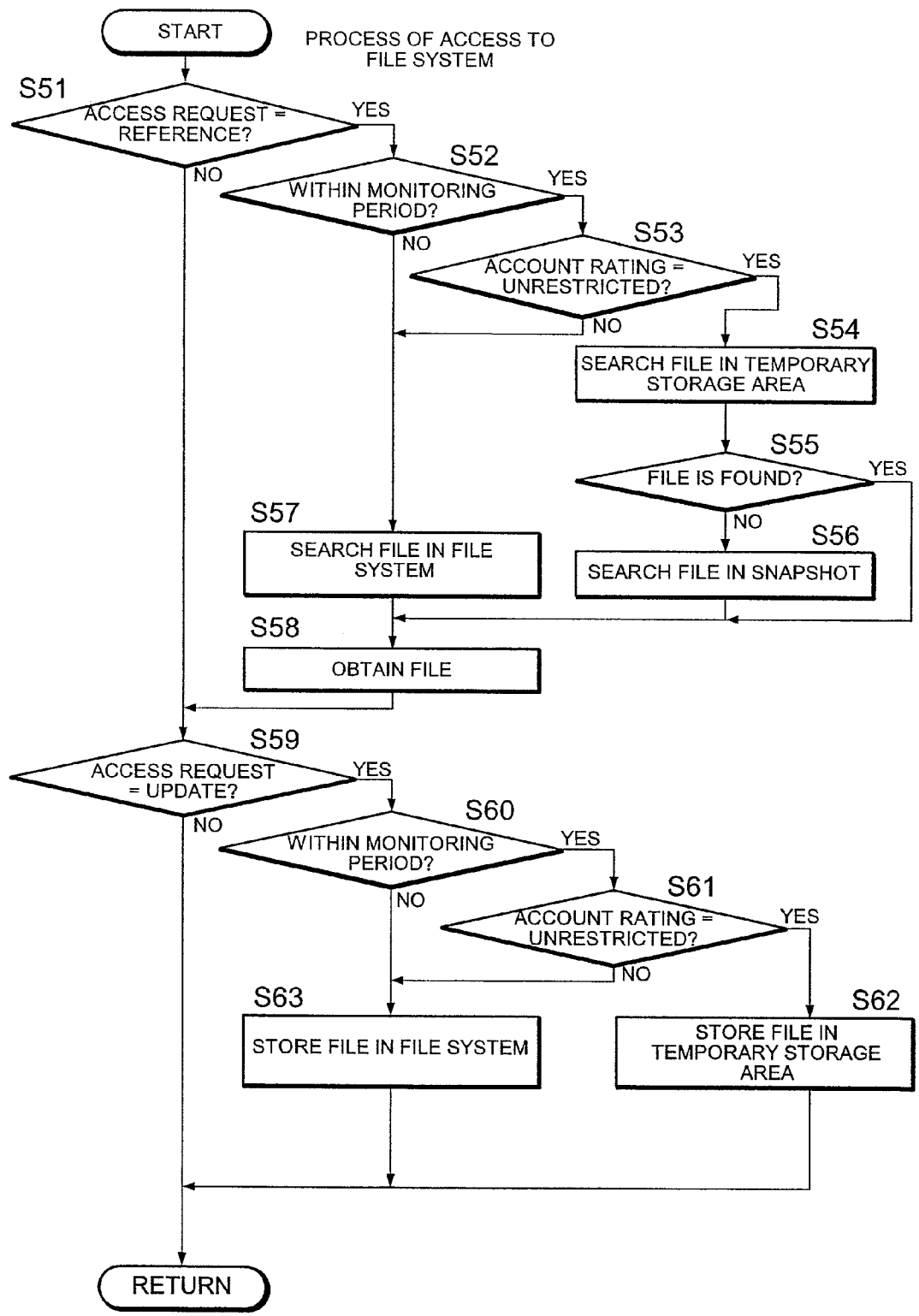
FIG. 9 is a flowchart showing a process of access to a file system.

Next, with reference to the subroutine of FIG. 9, the above-mentioned process of access to the file system performed in S29 will be described.

In S51, it is determined whether the access request from the client computer 8 is reference. When it is reference, the process proceeds to S52 to determine whether it is within the monitoring time. When it is within monitoring time, the process proceeds to S53. On the other hand, when it is outside the monitoring time, the process proceeds to S57 to perform the normal access process to search for the requested file in the file system.

On the other hand, when it is within the monitoring time as determined in S53, it is determined whether the account rating is the unrestricted rating level LV3. When it is the rating level LV3, the process proceeds to S54 to search the temporary storage area 33 for the requested file. Then, in S55, it is determined whether the requested file is found in the temporary storage area 33. When any relevant file is not found in the temporary storage area 33, then in S56, the snapshot is searched at the start of the monitoring time.

When the account rating is not the rating level LV3 in S53 described above, that is, when it is restricted rating level LV2, then the process proceeds to S57 to make search in the file system because file updates during the monitoring time will not be reflected.

In S58, obtained is the searched result at one of S54, S56 and S57 described above, and the above-mentioned process in S31 in FIG. 8 provides the obtained file as an output (response) to the client computer 8.

For a reference request, the requested file is searched for in the temporary storage area 33 only when it is within the monitoring time and the account rating is the unrestricted rating level LV3, and the snapshot is additionally searched when the requested file is not found in the temporary storage area 33. On the other hand, when the account rating is restricted rating level LV2, the requested file is searched for in the file system, which is not updated during the monitoring time by users assigned the unrestricted account rating level LV3.

Next, when the access request is not reference in S51, then the process proceeds to S59 to determine whether the access request is update. When it is update, the process proceeds to S60. Otherwise, the process ends.

When it is update, the process proceeds to S60 to determine whether it is within the monitoring time. When it is within the monitoring time, the process proceeds to S61. On the other hand, when it is outside the monitoring time, the process proceeds to S63 to perform the normal access process to store the requested file in the file system.

On the other hand, when it is within the monitoring time as determined at S61, it is determined whether the account rating is the unrestricted rating level LV3. When it is the rating level LV3, the process proceeds to S62 to store the requested file in the temporary storage area 33

Also, when the account rating is not LV3 at S61 described above, that is, when it is the restricted rating level LV2, then the process proceeds to S63 to make search in the file system because file updates during the monitoring time will not be reflected.

The file is stored at one of S62 and S63 described above, and the above-mentioned process in S31 in FIG. 8 provides a notification (response) that the storing is complete to the client computer 8.

For an update request, the file is stored in the temporary storage area 33 only when it is within the monitoring time and the account rating is the unrestricted rating level LV3. On the other hand, when the account rating is restricted rating level LV2, the requested file is searched for in the file system, which will be updated after the monitoring time with the snapshot at the start of the monitoring time.

Figure 10:
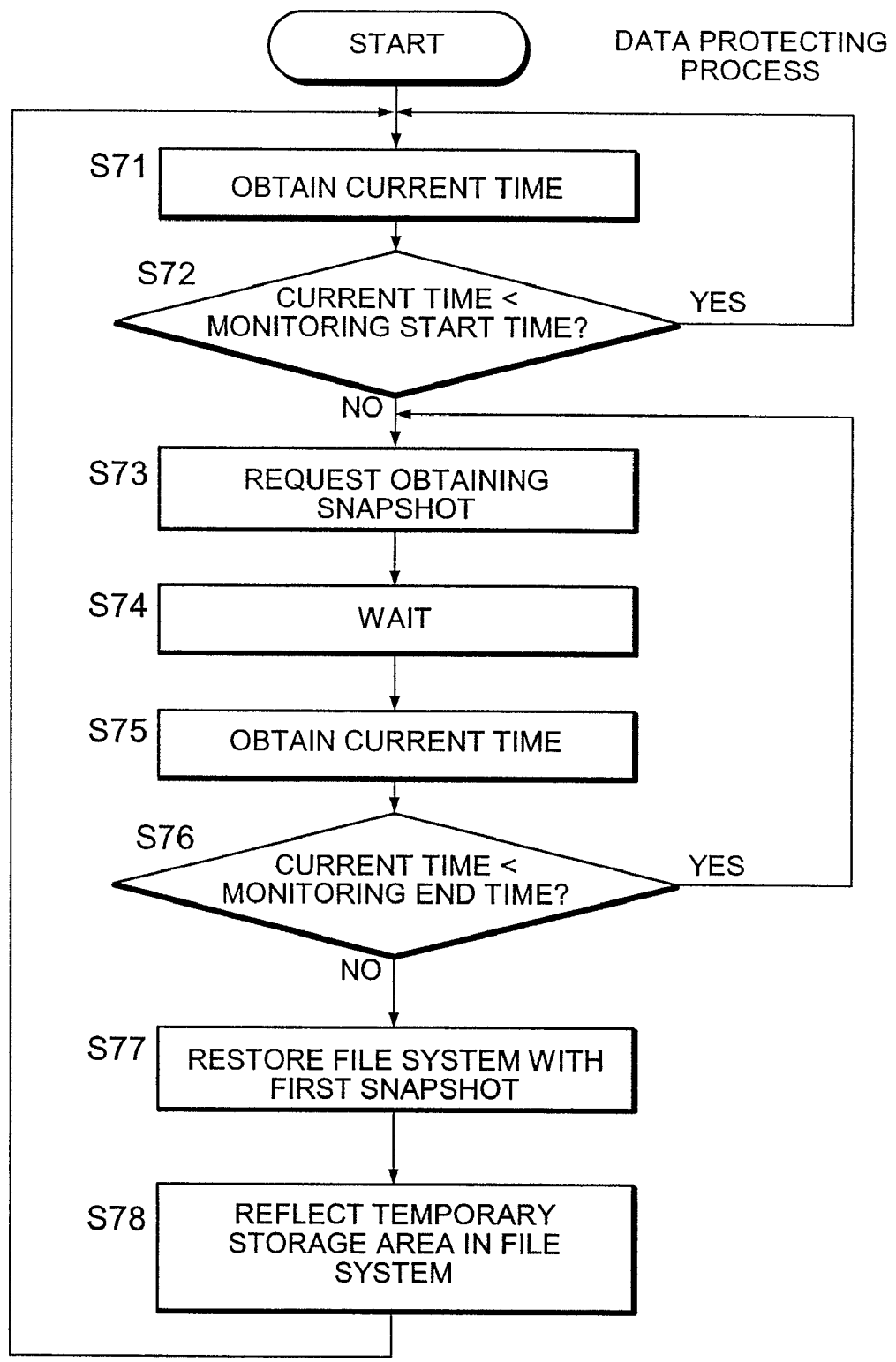
FIG. 10 is a flowchart showing an example of a data protecting process performed by a data protection unit.

Next, with reference to FIG. 10, the data protecting process performed by the data protection unit 23 will be described.

In S71, the current time is obtained. Then, in S72, it is determined whether the monitoring start time is reached. When the monitoring start time is reached, the process proceeds to S73. Otherwise, the process returns to S71.

In S73, a request is made to obtain a snapshot of the file system of the disk device 3 from the snapshot unit 24. In response to this request, the snapshot unit 24 obtains a snapshot SN1 at the start of the monitoring time and stores it in the snapshot memory area 32.

Subsequently, in S74, a predetermined waiting time is provided. Then, in S75, the current time is obtained. Then, in S76, it is determined whether the current time has reached the end time of the monitoring time. When it has reached the end time, the process proceeds to S76. Otherwise, the process returns to S73 and a request to obtain a snapshot is made again. In the loop of S73 to S76 described above, snapshots of the file system are obtained at predetermined time intervals and accumulated in the snapshot memory area 32.

When the end time is reached, in S77, the snapshot at the start of the monitoring time is read to update the file system. In this way, the content of the file system can be restored to the status at the start of the monitoring time.

Next, in S78, the content of the temporary storage area 33 is written into the file system, in which content users assigned the account rating level LV3 have made file updates. In this way, file updates made by users capable of full access with the account rating level LV3 can be reflected in the file system.

After the content of the temporary storage area 33 is written into the file system, the content of the temporary storage area 33 is cleared.

Figure 11:
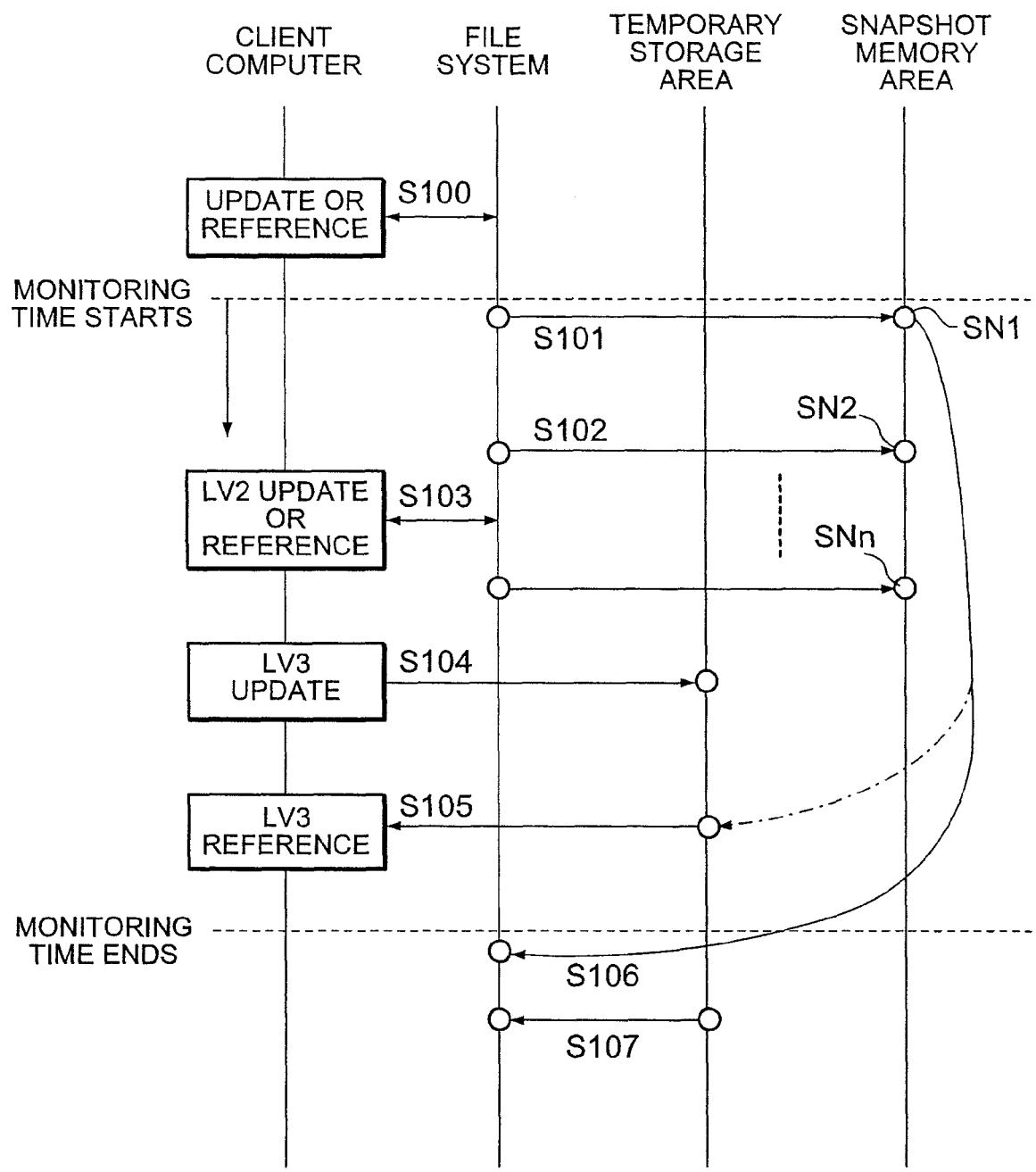
FIG. 11 is a time chart showing a relation of time to an access request and a data flow among the file system, a temporary storage area, and a snapshot memory area of the disk device.

With reference to FIG. 11, description will be made of an access request from the client computer 8, and the data flow among the file system, the temporary storage area 33 and the snapshot memory area 32 of the disk device 3 according to the above-mentioned process.

First, in S100 outside the monitoring time, references or updates are made to the file system in response to the access request from the client computer 8.

When the monitoring time has started, the snapshot SN1 of the file system at the start is obtained to store it in the snapshot memory area 32 (S101). Subsequently, the snapshots are obtained at a predetermined cycle, and accumulated as SN2, . . . , SNn in the snapshot memory area 32 (S102).

On the other hand, during the monitoring time, the account ID for each user of the client computer 8 is dynamically modified to the rating levels LV1 to LV3 according to the preset policy information 26. Thus, for the lowest rating level LV1, access is forbidden. Access is permitted only for the restricted rating level LV2 and the unrestricted rating level LV3.

Here, reference or update requests for the restricted rating level LV2 are made to the file system (S103).

On the contrary, update requests for the unrestricted rating level LV3 are made to the temporary storage area 33 provided for full-access rather than to the file system (S104). Reference requests for the rating level LV3 are first made to the temporary storage area 33, and when any relevant file is not found, the snapshot SN1 at the start of the monitoring time is searched and referred (S105).

Consequently, during the monitoring time, the restricted rating level LV2 is different from the unrestricted rating level LV3 in the region to be accessed, although the access request is made to the same NAS 1.

When the monitoring time expires, the file system is updated with the snapshot SN1 at the start of the monitoring time and restored to the status at the start of the monitoring time (S106).

Subsequently, the result of file updates made by users assigned the rating level LV3 during the monitoring time is written, from the temporary storage area 33 to the file system. Thus, only the result of updates that users having account IDs with the unrestricted rating level LV3 have made is reflected in the file system.

As described above, during the monitoring time for data protection, the normal account IDs are dynamically modified, so that access rights for data stored in the disk device 3 are changed by using the rating level LV3 for preserving the update results, the rating level LV2 for revoking the update results, and the rating level LV1 for forbidding access.

Accordingly, when it is necessary for operators or other outsiders to perform operations when the administrator is absent such as at night or on holidays, account IDs corresponding to the restricted rating level LV2 are lent during the monitoring time.

On the other hand, account IDs corresponding to the unrestricted rating level LV3 during the monitoring time are assigned to users who perform normal business operations during the same time zone as the maintenance operations.

Since the maintenance operators can access the file system using the restricted rating level LV2, they can normally perform maintenance operations. Even if they should erroneously update or erase any files in the file system, the file system can be automatically restored to the status at the start of the monitoring time using the snapshot SN1 after the monitoring time expires. Consequently, any illegal updates or erasures as well as erroneous file updates cannot be reflected in the file system, thereby greatly enhancing security.

In particular, even when account IDs are lent to outsiders and they subsequently make illegal access in the administrator's absence, the file system is definitely restored to the status at the start of the monitoring time. This can give a higher level of security to the NAS 1 that provides files.

On the other hand, when the account IDs of users who perform business operations during the same time zone as the maintenance operations are made to correspond to the unrestricted rating level LV3, those users make access only to the snapshot of the file system at the start of the monitoring time and to the temporary storage area 33 that stores updated files, and do not make access to the file system during the monitoring time. Consequently, they do not suffer from any influence due to the maintenance operations and can perform business operations as usual, so that availability can be remarkably enhanced.

The administrator needs only to set the correspondence between the account IDs and the rating levels LV1 to LV3, and the monitoring time or period. At the start of maintenance operations by outsiders, the administrator does not need to lend account IDs for granting access permission or to modify the configuration of access right of the file system. The administrator can previously lend predetermined account IDs to outsiders who perform maintenance operations, so that the access rights can be automatically modified even in the administrator's absence. This enables both of maintenance operations compatible and normal business operations and ensures a very high level of security while significantly reducing the efforts required for administration. Consequently, it is possible to solve the problem that access rights cannot be granted in the administrator's absence at the time of maintenance operations at night or on holidays.

To prevent files from being tampered or destroyed when account IDs lent to outsiders are abused in the administrator's absence, the file system is restored to the status at the start of the monitoring time when the monitoring time expires. Thus, any influence due to abuse of account IDs can be eliminated, and data can be reliably protected.

For account IDs of less security-conscious users having lower change frequency of password or smaller number of password characters, their access rights during the monitoring time such as at night or on holidays may be dynamically modified to be the low rating level LV1; access is forbidden. This can solve the problem as to how to prevent account IDs having a low level of security from being used in illegal access in the administrator's absence and the like.

On the contrary, for account IDs of more security-conscious users having higher change frequency of password and greater number of password characters, their access rights during the monitoring time such as at night or on holidays may be dynamically modified to be the high rating level of access right. This allows for accomplishment of business operations in the administrator's absence, and satisfies both assurance of security compatible and convenience.

Furthermore, snapshots are obtained and accumulated at predetermined time intervals during the monitoring time. If any illegal or unintentional access should occur, the history of change can be traced in time series.

In the above embodiment, the rating level during the monitoring time is determined based on the authentication method, the change frequency of password and the like for each account ID. However, the administrator may set the rating level for each account ID.

In the above embodiment, the rating level for modifying access rights during the monitoring time is set for each account ID of the user. However, the present invention is not limited thereto. For example, the policy information 26 may be set so that the rating levels are set for each department, network, or user group.

The above embodiment is illustrated of an authentication method based on the input of the account ID and password, and the IC card. However, biometrics for fingerprints or face may be used. Account IDs using such biometrics may correspond to the highest rating level. In other words, an authentication method (type of authentication information) which makes it more difficult to spoof the owner of the account ID may correspond to a higher rating level. For example, the rating levels LV1 to LV3 may be assigned to password input, IC card and biometrics in this order. Namely, a higher rating level (broader access range or access form) can be set to the authentication information with higher reliability (difficulty of impersonation of a real user), whereas a lower rating level can be set to the authentication information with lower reliability.

In the above embodiment, the present invention is applied to the NAS 1. However, the present invention may be applied to the file server or client computer.

In the above embodiment, the snapshot memory area 32 and the temporary storage area 33 are configured in the same disk device 3. However, they can be configured in any disk devices.

The above embodiment adopts an example of operating the file server unit 22 and the data protection unit 23 on the same controller 10. However, the data protection unit 23 may be operated on another computer.

The above embodiment is illustrated of a situation where access rights for files are dynamically modified. However, the present invention is not limited thereto. Access rights for computer resources (optical disk devices or other drives, and printers or other output devices) and network resources (servers, printers or other output devices, and scanners or other input devices) may be dynamically modified during the monitoring period.

The above embodiment adopts an example of using the disk device 3 for the storage device that stores files. However, the present invention is not limited thereto. Optical disk devices or semiconductor memories capable of updating files may be used.

While the present invention has been described in detail and pictorially in the accompanying drawings, the present invention is not limited to such detail but covers various obvious modifications and equivalent arrangements, which fall within the purview of the appended claims.

What is claimed is:

1. A data protection method for accepting an access request for a file stored in a file system of a storage device and referring or updating to the file based on the access request, comprising the steps of:

relating a first user to a first kind of permitted access class which restrictively permits the first user to access for maintenance of the file during a preset monitoring period, relating a second user to a second kind of permitted access class which permits the second user to access without restriction during the monitoring period, and relating a third user to a third kind of permitted access class which rejects any access from the third user to during the monitoring period;

determining whether a current time is within the monitoring period;

obtaining a snapshot of the file system at the time of start of the monitoring period after the current time reaches the start of the monitoring period;

writing an update file as an object of an update request into the file system during the monitoring period in response to the write request accepted from the first user;

writing an updated file as an object of an update request into a temporary storage area during the monitoring period in response to the update request accepted from the second user, the temporary storage area is provided with a storage device and being different from the file system;

rejecting an update request accept from the third user during the monitoring period;

restoring the file system with the snapshot of the file system at the time of start of the monitoring period to revoke the file updated by the first user during the monitoring period, after the current time reaches to the end of monitoring period; and writing, after the restoring with the snapshot, the updated file in the temporary storage area written by the second user into the file system.

2. The data protection method according to claim 1, further comprising:

referring to a file as an object of a reference request from the file system in response to a reference request accepted from the first user during the monitoring period; and referring to a file as an object of a reference request from the temporary storage area in response to the reference request accepted from the second user during the monitoring period.

3. The data protection method according to claim 2, wherein the referring to a file as an object of a reference request from the temporary storage area in response to the reference request accepted from the first user comprises referring to the requested file from the snapshot when the requested file is not found in the temporary storage area.

4. The data protection method according to claim 1, wherein the first kind of permitted access class or the second kind of permitted access class is set based on a type of a authentication information or each user, the authentication information includes reliability and update frequency of each user.

* * * * *